Aug. 24, 1937.    R. D. GROCH    2,091,039
SLIDE RULE
Filed April 7, 1934
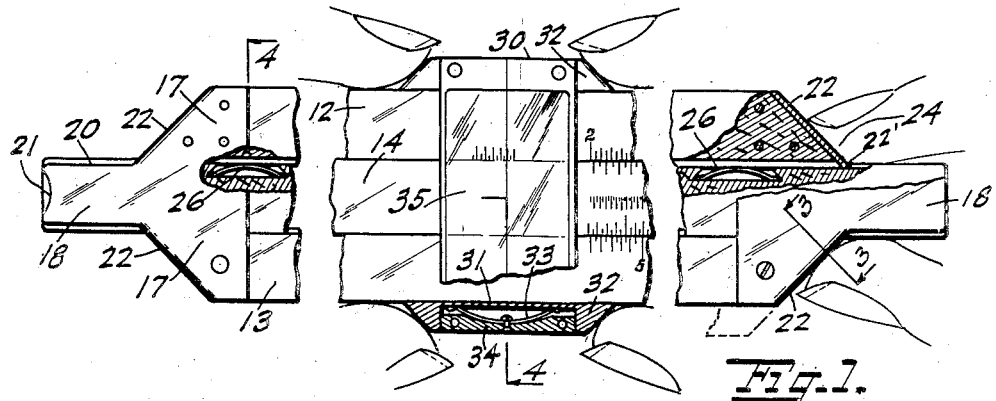
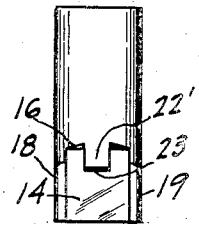
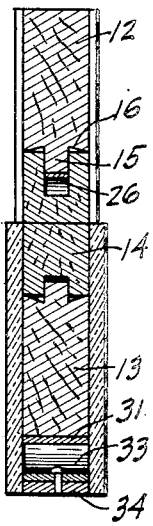
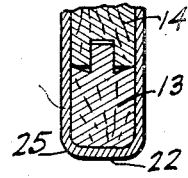
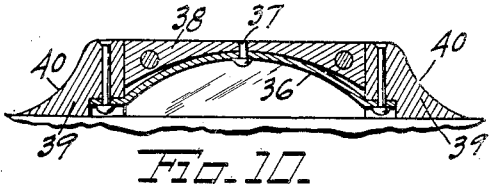
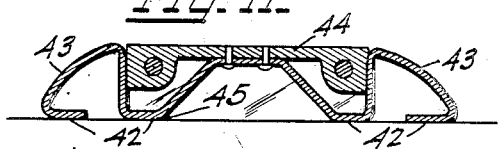
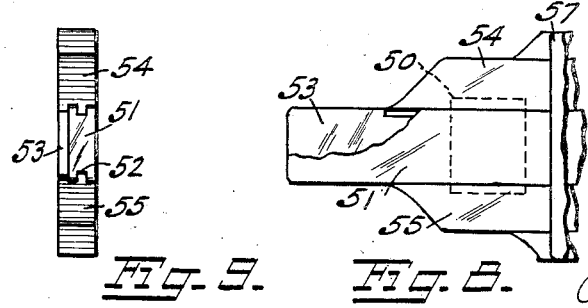
INVENTOR.
Robert D. Groch
BY
Philip A. Driedel
ATTORNEYS.

Patented Aug. 24, 1937

2,091,039

UNITED STATES PATENT OFFICE 2,091,039

SLIDE RULE

Robert D. Groch, Berkeley, Calif.

Application April 7, 1934, Serial No. 719,482

3 Claims. (Cl. 235—70)

This invention is a slide rule, differing from the usual slide rule in features which promote precision in all adjustments with convenient and comfortable operation, while still permitting the usual style of operation for all rough adjustments.

Slide rules as presently manufactured, are frictionally variable with variations in adjustment of the sliding bar relative to the fixed bars. The slider, or indicator, due to the type of construction and the combination of elements employed, permits wabbling, introducing parallax. The sliding bar and slider require extreme care and fineness of touch to obtain perfect registration, and in some positions of the sliding bar, or under certain atmospheric conditions, the friction value between the sliding bar and the fixed bars may be entirely lost, whereby the sliding bar may voluntarily move from its adjusted position by its own weight, causing inaccurate calculations or results.

All of these undesirable features have been overcome in my new improved slide rule;

First, by the provision of friction producing elements which maintain uniform friction between the sliding bar and the fixed bars under all atmospheric conditions and in all adjusted positions of the sliding bar.

Second, by a type of construction in the slider indicator mounting which prevents any wabbling thereof, maintaining the indicator line truly perpendicular to the longitudinal edges of the bars.

Third, by providing the slider and the fixed bars with specially formed, finger-cooperating surfaces at the ends and corners, whereby pressure or rolling action of the fingers, (which is naturally easy of control), produces any desired minute movement of the slider or the sliding bar, depending upon the degree of pressure applied.

Fourth, by reversing the tongue and groove system in the sliding and fixed bars to provide a greater superficial area of contact for the fingers on the longitudinal edges of the movable bar.

The main object of my invention therefore, is to provide a slide rule which maintains the proper degree of friction between the sliding bar and the fixed bars under all conditions of adjustment and atmosphere, and which is provided with the greatest superficial finger-contact area on the longitudinal edges of the sliding bar for comfortable manipulation of the adjustment means.

Another object of the invention is to provide a device as outlined with suitably formed finger-contacting ends and corners, whereby the sliding bar and the slider may be subjected to minute adjustments by a squeezing or rolling action of the fingers and thumbs, whereby minute adjustments are obtained with greater rapidity and precision than is obtainable with the relatively coarse and fluctuating adjustments as apply to present types of slide rules.

A further object of the invention is to provide a device as outlined with a non-wabbling slider or indicator, which maintains a uniform degree of friction in all adjusted positions and which is always maintained in a truly perpendicular position as related to the scales.

Other objects and advantages of the invention will become apparent as the following description is read on the drawing forming a part of this specification, and in which similar reference characters are used to indicate similar parts throughout the several views, of which:

Fig. 1 is a plan view of my invention, shown fragmentarily.

Fig. 2 is an enlarged, half-end view of Fig. 1.

Fig. 3 is a section taken on line 3—3 of Fig. 1, and shown on an enlarged scale.

Fig. 4 is an enlarged section taken on line 4—4 of Fig. 1.

Fig. 5 is a fragmentary, enlarged sectional view of a preferred arrangement of the friction stabilizing means for the sliding bar.

Fig. 6 is a section taken on line 6—6 of Fig. 5.

Fig. 7 is a modified form of end section applicable to existing standard rules.

Fig. 8 shows my invention applied to a single face slide rule.

Fig. 9 is an end elevation of Fig. 8.

Fig. 10 is a sectional view through a modified arrangement of slider shoe.

Fig. 11 is another modification of the slider shoe.

The invention consists of a slide rule or other slidably adjustable calculating device, having two bars 12 and 13 forming the body and a sliding bar 14, in which the tongue and groove system is reversed from that used now in slide rules, the standard procedure being to form the tongue on the sliding bar, while in my invention the tongue is on the fixed bars and the grooves in the movable bar. This arrangement provides a more comfortable finger bearing on the sliding bar, as will become perfectly obvious from a study of the drawing.

The construction of the tongue and groove is also modified, the tongue 15 having its root 16 relieved so as to obtain accuracy of register between the cooperating scales and bar edges.

End guards, consisting of spanning members or heads 17, immovably secured to one of the fixed bars 12 and adjustably secured to the other fixed bar 13, form the spacing elements and supports for the fixed bars, and have extensions 18 and 19 which project outwardly to the ends of the sliding bar when in intermediate position, although the width of the extension is less than, and preferably made from 80% to 95% of that of the sliding bar, as shown at 20, so as to permit transverse gripping of the bar between the fingers and thumb for coarse adjustments. A finger recess may be provided as shown at 21 for starting the sliding bar.

The portion of the heads extending over the terminal ends of the fixed bars 12 and 13 are formed diagonally to the side edges of the sliding bar as indicated at 22, this diagonal portion consisting of a wall which has a tongue extension 22' fitting into the groove 23 of the sliding bar, so as to prevent pinching of the fingers when the bar is micrometrically adjusted by the squeezing or rolling action of the fingers and thumb cooperating between the side edges of the sliding bar and the diagonal faces of the heads as shown at 24. The wall 22 is transversely rounded as shown at 25 to permit micrometric operation in angular relation to the sliding bar.

The balanced friction means consists preferably of a spring or other resilient element 26 mounted in the sliding bar and cooperating with the tongue on one of the fixed bars, these springs being located as close to the terminal ends of the tongues on the fixed bars as possible, so as to prevent the combined friction of two springs except when the sliding bar is in its mean position. Thus, the friction for all adjustments of the sliding bar is identical except when the sliding bar is centered longitudinally of the fixed bars.

It will be noted that the squeezing action of a finger applied simultaneously to a diagonal face and the normal side surface of an adjacent element or bar, produces a force at right angles to the diagonal surface, which is resolved into a propelling force for propelling one element relative to the other, and coincidently produces a friction-creating force at right angles to the propelling force, whereby the relative movement between the elements is under complete control.

This purpose is more accurately accomplished by the method shown in Figs. 5 and 6 in which the spring 27 is attached to the wall 22 as indicated at 28 and rests on the longitudinal edge of the sliding bar 14, thereby being located at the closest point to the edge 29 whereby uniformity of friction is maintained throughout all adjustments of the sliding bar except in its mean position.

The slider or indicator consists of two opposed shoes 30 and 31 which bear directly on the longitudinal edges of the fixed bars and terminate at their opposite ends in finger cooperating members 32 having inclined faces as shown, whereby, with the fingers coincidently contacting the inclined faces and the longitudinal edges of the fixed bars, squeezing or rolling movement of one finger with coincident easing of pressure of the other finger will urge the slider along the bars with absolute precision.

It will be noted that the shoe 30 is made in one continuous section, while the shoe 31 is relieved to receive a spring 33 which is fixed to a mounting block 34 to which the glass 35 is secured, the spring maintaining friction and alignment through the shoe, of the slider in any adjusted position. The diagonal faces of the finger cooperating members have their edges rounded similar to the construction shown in Fig. 3, at 25.

A modification of the slider is shown in Fig. 10 in which the spring 36 is secured intermediate its length at 37 to the mounting block 38, to which the glass or lens is secured, the spring having its terminal ends secured to the shoes 39, the diagonal faces having been modified to a slightly curved form 40.

Another modification of the slider is shown in Fig. 11, in which the spring is continuous to form the shoe 42 and urging face 43, and is intermediately secured to the mounting block 44. It will be noted that any deflection of the central portion of the spring tends to rock about the point 45, deflecting the urging block 43 portion by cooperation with the ends of the mounting block, thus maintaining the uniformity of shoe bearing on the edge of the fixed bar.

A modification of one of the standard forms of slide rules is shown in Fig. 7, in which the edges 46 and 47 are merely beveled to adapt it to my precision system, the standard rule being formed to the shape indicated by the dotted lines 48.

In Figs. 8 and 9 are shown my modified form of a standard single slide rule which is usually provided with a window or opening 50 back of the sliding bar 51. My modification provides for the reversal of the tongue and groove, the groove 52 being formed in the sliding bar. Another differentiating feature is the extension of the backing member 53 forming an integral part of the fixed bars 54 and 55 outwardly to the terminus of the sliding bar 51 in its mean position, while making the portion 53 slightly narrower than the sliding bar to permit transverse gripping of the sliding bar between the fingers and thumb, and forming a protective guard for the sliding bar.

The ends of the fixed bars are also diagonally formed or formed with curved faces for finger urging cooperation. The slider is made in any of the forms previously described except requiring only one sight glass or lens, since the back of the sliding bar is only read through the window or opening.

Now, as will be noted, the slider and sliding bar may be just as quickly shifted as in present types of slide rules, however, absolute precision is instantly obtainable by placing the fingers and thumbs as shown in Fig. 1 after the coarse adjustment is made, then squeezing between the finger and thumb of one hand, while simultaneously easing up with the other finger and thumb. The same results are obtained by complementary rolling action of the fingers and thumbs.

The specific mounting of the slider assures perfect registry, the specific location of the friction springs assures uniformity of friction and operation, and the end guards 18 and 53 protect the ends of the sliding bars against damage.

It will be understood that variations in construction and arrangement of parts which are consistent with the appended claims, may be resorted to without detracting from the spirit or scope of the invention or sacrificing any of the advantages thereof.

I claim:

1. In a slide rule having a body, and a slide of greater length than the body and initially projecting equally from the opposite ends of the body and having tongue-cooperative grooves; end guards having top and bottom walls and affixed to the opposite ends of said body, each of said walls including an integral slide guard portion extending to the end of the slide when the slide is in its initial position, said slide-guard portions having a width between 85% and 95% of the width of the slide.

2. In a slide rule having a body and a slide of greater length than the body and projecting equally from the opposite ends of the body in the initial position of the slide, and having tongue-cooperative grooves formed in its side edges; end guards having top and bottom walls and affixed to the opposite ends of the body, slide-guard portions integral with said walls and extending to the ends of the slide when the slide is in its initial position and having a width equal to substantially 90% of the width of the slide, said end guard walls diverging from said slide-guard portions to the corners of the body, and interconnecting walls between the divergent edges of said top and bottom walls.

3. In a slide rule having a body having corners, and a slide of greater length than the body and projecting equally from the opposite ends of the body when the slide is in its initial position and having tongue-cooperative grooves formed in its side edges; an end guard for each end of the body and affixed thereto, each end guard having a top wall and a bottom wall converging outwardly from the corners of the body and terminating in slide guard extending to the end of the slide when the slide is in its initial position and having a width equal to about 90% of the width of the slide, edge walls formed between the top and bottom walls throughout the length of the converging portion thereof, and a tongue projecting from the inner end of each edge wall and fitting in the tongue-cooperative groove.

ROBERT D. GROCH.